(12) United States Patent
Oishi et al.

(10) Patent No.: US 6,454,450 B1
(45) Date of Patent: Sep. 24, 2002

(54) VEHICULAR LAMP

(75) Inventors: Kazutami Oishi; Yu Shinomiya; Hideaki Nakazawa, all of Shimizu (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 0 days.

(21) Appl. No.: 09/614,949

(22) Filed: Jul. 12, 2000

(30) Foreign Application Priority Data

Aug. 18, 1999 (JP) .............................................. 11-232053

(51) Int. Cl.⁷ ................................................. B60Q 1/00
(52) U.S. Cl. ......................... 362/544; 362/265; 362/391
(58) Field of Search ................................ 362/487, 538, 362/543, 544, 546, 548, 549, 265, 457, 458, 391, 396

(56) References Cited

U.S. PATENT DOCUMENTS

| | | | | |
|---|---|---|---|---|
| 2,814,667 A | * | 11/1957 | Hollins | 362/487 |
| 5,678,916 A | | 10/1997 | Watanabe et al. | 362/61 |
| 5,895,113 A | * | 4/1999 | Ozaki et al. | 362/546 |
| 5,941,633 A | * | 8/1999 | Saite et al. | 362/543 |

* cited by examiner

*Primary Examiner*—Y. My Quach-Lee
(74) *Attorney, Agent, or Firm*—Rosenthal & Osha L.L.P.

(57) ABSTRACT

A vehicular lamp includes a lamp body formed with a hole, and an annular wall surrounding a peripheral of said hole. The lamp body is formed with a boss and a hook in the vicinity of the annular wall to regulate the position of power supply cords in order not to deviate apart from the annular wall.

15 Claims, 6 Drawing Sheets

VEHICULAR LAMP

This patent application claims priority based on a Japanese patent application, H11-232053 filed on Aug. 18, 1999, the contents of which are incorporated herein by reference.

BACKGROUND OF THE INVENTION

1. Field of the Invention

The present invention relates to a vehicular lamp including a back cover. More particularly, the present invention relates to a structure for retaining power supply cords for the vehicular lamp.

2. Description of the Related Art

Generally, as shown in FIG. 5, a vehicular lamp such as a headlamp is formed with a lamp body 102 having an opening 102a for exchanging a light source bulb. The lamp body 102 is also formed with an annular wall 102b at the peripheral of the opening 102a. A back cover 104 is designed to be attached to the annular wall 102b to cover the opening 102a. As shown in FIG. 5, the conventional vehicular lamp includes a power supply cord 106 running in the vicinity of the annular wall 102b.

With respect to the conventional type of vehicular lamp as described above, there may be a problem where the power supply cord 106 is caught by the lamp and a vehicle body when the lamp is attached to the vehicle body. Therefore, the lamp includes a boss 102c in the vicinity of the annular wall 102b of the lamp body 102 to regulate the position of the power supply cord 106 so that the cord is prevented from displacing apart from the annular wall 102b. The lamp further includes a washer 110 fixed to the boss 102c by a screw 112, for controlling the power supply cord 106 in order not to pop up from the desired position defined by the annular wall 102b and the boss 102c.

However, with respect to the above conventional vehicular lamp, the washer 110 and the screw 112 are required to retain the power supply cord 106 in order not to pop out of the desired position. Accordingly, as many parts are required, manufacturing cost for the conventional vehicular lamp is high.

SUMMARY OF THE INVENTION

Therefore, it is an object of the present invention to provide a vehicular lamp having a structure in which power supply cords are not caught by the lamp and a vehicle body when the lamp is attached to the vehicle body, without increasing the number of required parts.

The present invention relates to a vehicular lamp having a structure in which power supply cords are retained so as not to deviate from the desired position, by using a back cover for the lamp.

According to the first aspect of the present invention, a vehicular lamp includes: a light source bulb; a lamp body having a rear wall portion formed with an opening and an annular wall surrounding a periphery of the opening; a back cover attached to the annular wall to cover the opening; a power supply cord running in the vicinity of the annular wall and connecting to the light source bulb; and a cord retaining structure projecting from the rear wall portion of the lamp body in the vicinity of the annular wall, the retaining structure engaging with the power supply cord.

According to a second aspect of the invention, in the vehicular lamp, the retaining structure includes a first retaining member and a second retaining member separate from each other by a predetermined distance therebetween.

According to a third aspect of the invention, in the vehicular lamp, the first retaining member comprises a boss projecting from the rear wall portion of the lamp body and the second retaining member comprises a hook which is formed like a reverse L-shape and its tip end pointing to the annular wall.

According to a fourth aspect of the invention, in the vehicular lamp, the retaining structure further comprises a third retaining member disposed between the first and second retaining members and the light source bulb.

According to a fifth aspect of the invention, in the vehicular lamp, the back cover comprises a restricting flange extending over the power supply cord in the middle of the first retaining member and the second retaining member.

According to a sixth aspect of the invention, in the vehicular lamp, the back cover further comprises a rib extending from substantially the center thereof to the restricting flange.

According to a seventh aspect of the invention, in the vehicular lamp, the retaining structure comprises at least one wall extending along the annular wall.

According to an eighth aspect of the invention, in the vehicular lamp, the retaining structure comprises a plurality of walls extending along the annular wall.

According to a ninth aspect of the invention, in the vehicular lamp, the back cover comprises a restricting flange extending over the power supply cord.

According to a tenth aspect of the invention, in the vehicular lamp, the back cover further comprises a rib extending from substantially the center thereof to the restricting flange.

According to an eleventh aspect of the invention, in the vehicular lamp, the wall comprises a cut-out portion.

According to a twelfth aspect of the invention, in the vehicular lamp, the retaining structure is formed integrally with the rear wall portion of the lamp body by injection molding.

According to a thirteenth aspect of the invention, in the vehicular lamp, the restricting flange is formed integrally with the back cover by injection molding.

According to a fourteenth aspect of the invention, in the vehicular lamp, the restricting flange is formed integrally with the back cover by injection molding.

According to a fifteenth aspect of the-invention, the vehicular lamp further includes a clip member engaging with the power supply cord and disposed between the retaining structure and the light source bulb.

According to a sixteenth aspect of the invention, the vehicular lamp further includes a first lamp chamber installing therein a first light source bulb and a second lamp chamber formed adjacent to the first lamp chamber and installing therein a second light source bulb, wherein the power supply cord connects to the first light source bulb.

According to a seventeenth aspect of the invention, the vehicular lamp further includes a first lamp chamber installing therein a first light source bulb and a second lamp chamber formed adjacent to the first lamp chamber and installing therein a second light source bulb, wherein the power supply cord connects to both the first light source bulb and the second light source bulb.

According to an eighteenth aspect of the invention, in the vehicular lamp, the boss is conical with its top cut off.

As described above, the vehicular lamp according to the present invention has a structure in which power supply cords run in the vicinity of an annular wall, which receives a back cover. The lamp includes a retaining structure for securing the position of the power supply cords in order to prevent the cords from deviating apart from the annular wall. The back cover is formed with a restricting flange for restricting the power supply cords in order to prevent the cords from popping out of the desired position between the annular wall and the retaining structure. Therefore, when the lamp is attached to a vehicle body, the power supply cords are not caught by the lamp and the vehicle body.

As described above, the vehicular lamp according to the present invention has a retaining structure for the power supply cords which requires few parts or no additional part, which ensures that the power supply cords are not caught by the lamp and the vehicle body.

In the above structure, two parts of the retaining structures for fixing the position of the power supply cords may be formed along the periphery of the annular wall which are spaced from each other by a predetermined distance. The restricting flange of the back cover is formed at a position between two parts of the retaining structure, to reliably regulate the power supply cords and prevent it from popping out.

The "power supply cords" may be connected to a light source bulb installed in a center lamp chamber positioned in front of the opening or may be connected to another light source bulb installed in a chamber adjacent to the center lamp chamber. When the power supply cords are connected to the light source bulb installed in the latter chamber, the power supply cords can easily be set running.

The above summary of the invention does not necessarily describe all necessary features of the present invention. The present invention may also be a sub-combination of the above described features. The above and other features and advantages of the present invention will become more apparent from the following description of embodiments taken in conjunction with the accompanying drawings.

DETAILED DESCRIPTION OF THE INVENTION

Preferred embodiments of the present invention will now be described with reference to accompanying drawings.

Figure 1:
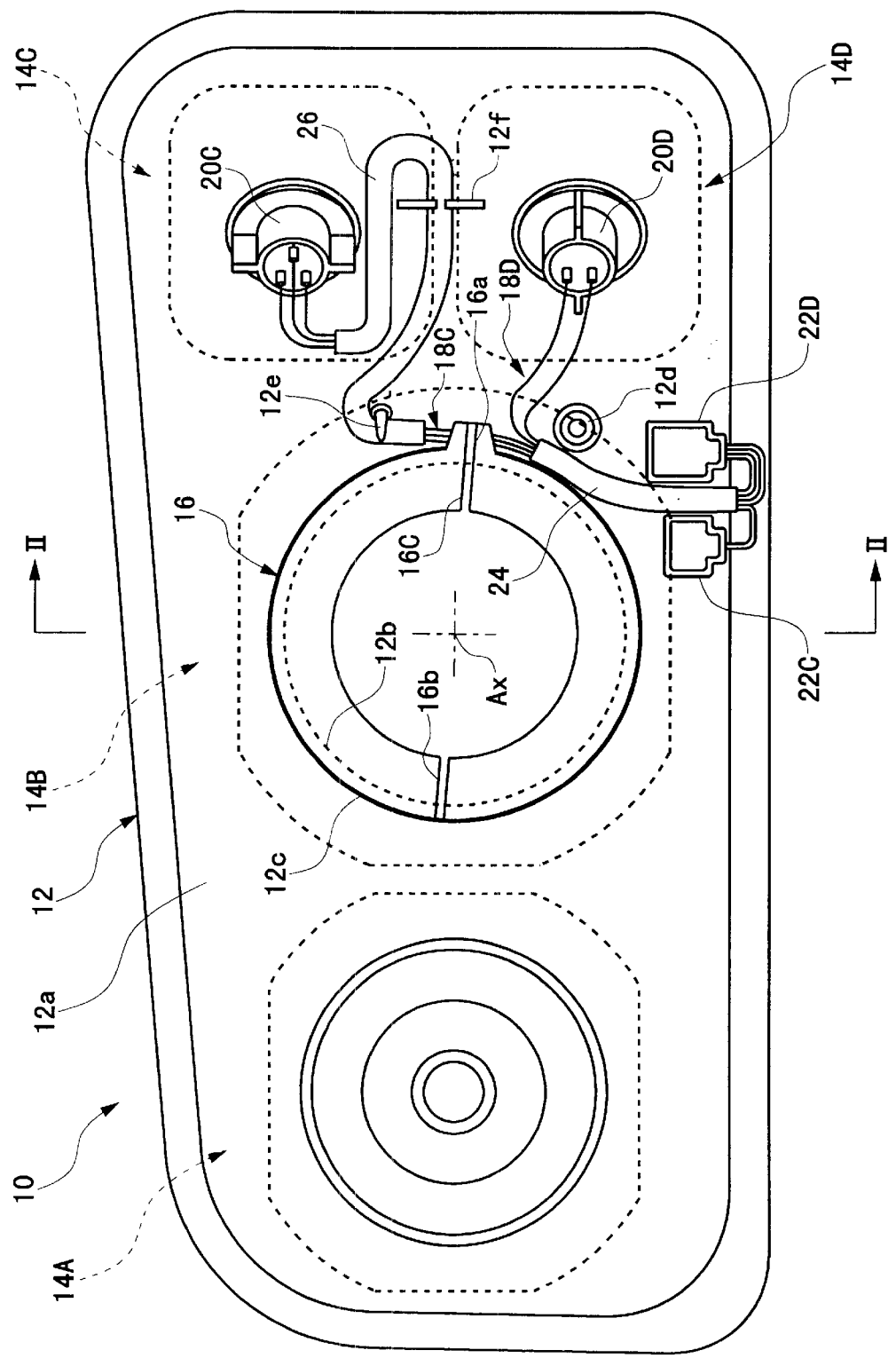
FIG. 1 is a backside view showing a vehicular lamp of an embodiment of the present invention.
Figure 2:
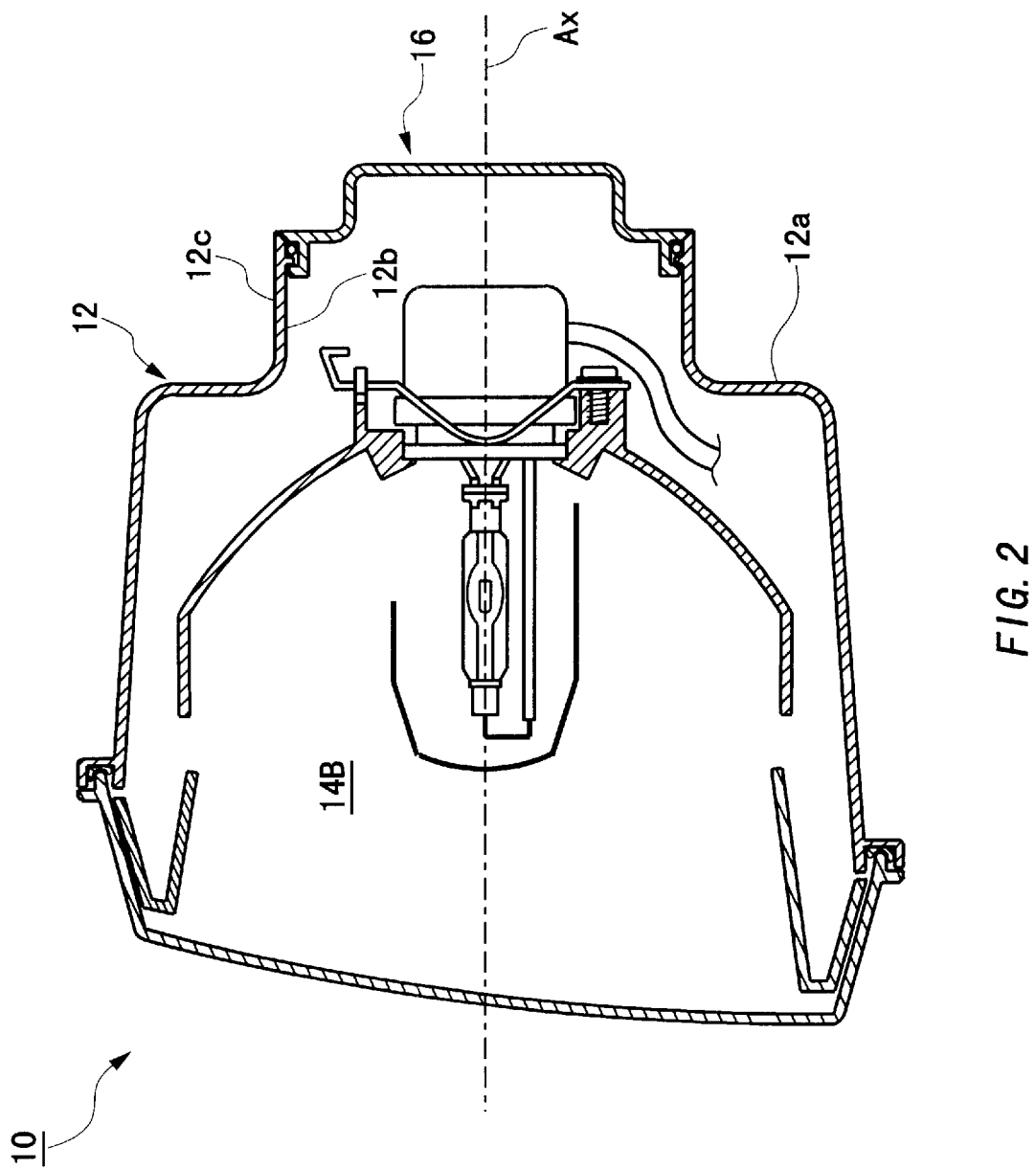
FIG. 2 is a cross-sectional view taken on line II—II in FIG. 1.
Figure 3:
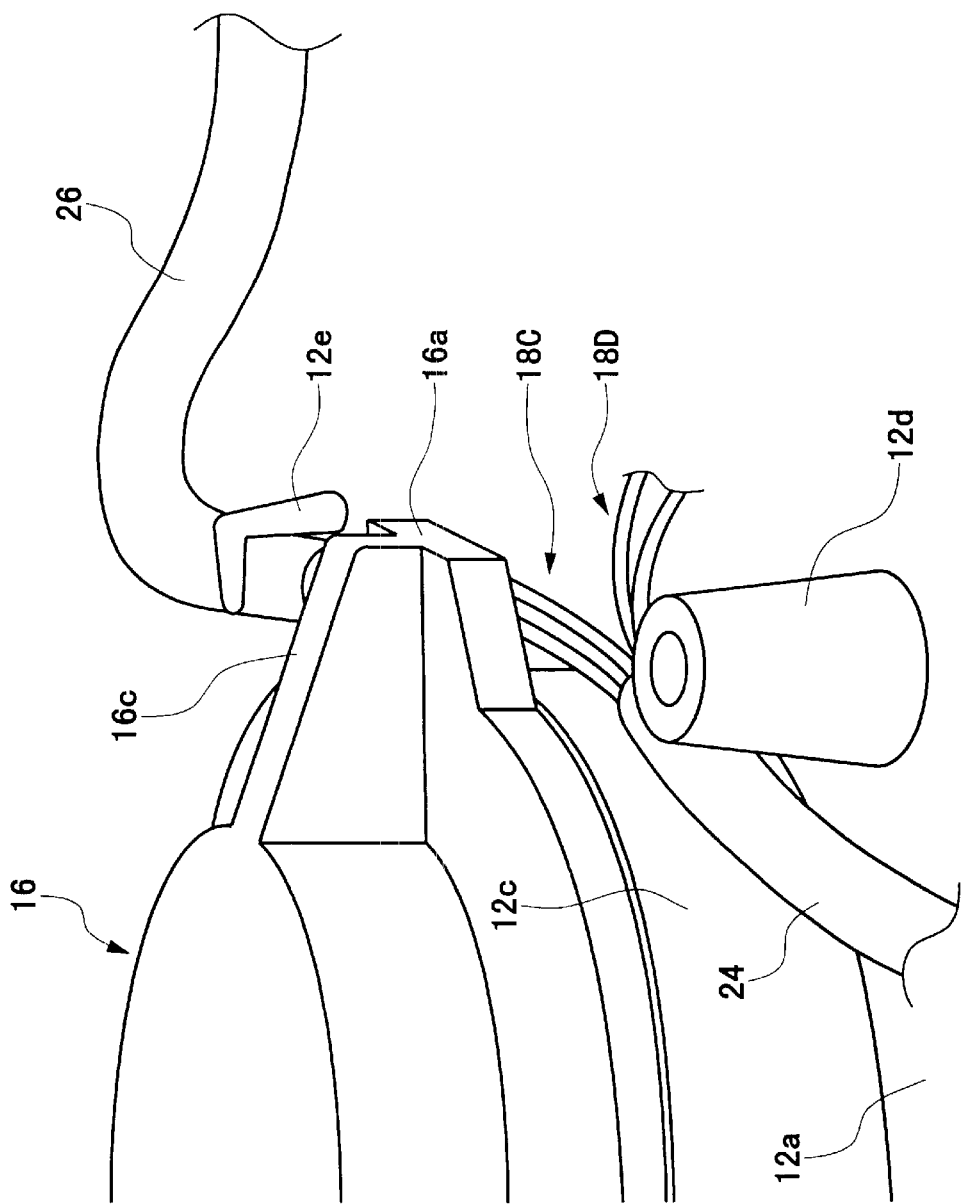
FIG. 3 is an enlarged perspective view of the vehicular lamp shown in FIG. 1.

FIG. 1 is a backside view showing a vehicular lamp of an embodiment of the present invention. FIG. 2 is a cross-sectional view take no line II—II in FIG. 1. FIG. 3 is an enlarged perspective view of the vehicular lamp shown in FIG. 1.

As shown in FIGS. 1 to 3, the vehicular lamp 10 is a combination headlamp, which functions as four-types of headlamp and a signal lamp. The vehicular lamp 10 includes a lamp body 12, which is divided into four lamp chambers including a high beam lamp chamber 14A, a low beam lamp chamber 14B, a cornering-clearance lamp (a side marker lamp) chamber 14C and a front/side turn signal lamp chamber 14D.

The low beam lamp chamber 14B is formed in the center of the lamp body 12. The high beam lamp chamber 14A is formed adjacent to the low beam lamp chamber 14B. The cornering-clearance lamp chamber 14C and the front/side turn signal lamp chamber 14D are respectively formed adjacent to the low beam lamp chamber 14B, on the opposite side of the chamber 14A, such that the lamp chamber 14C is positioned upward of the lamp chamber 14D in FIG. 1.

The lamp body 12 includes a rear wall portion 12a which is formed with an opening 12b at a rear side of the low beam lamp chamber 14B. An annular wall 12c is formed at the peripheral of the opening 12b. The lamp body 12 includes a back cover 16 which is attached to the annular wall 12c to cover the opening 12b. The lamp body 12 further includes electric cords 18C and 18D running in the vicinity of the annular wall 12c.

Each of the electric cords 18C are connected at one end to a light source bulb 20C of the cornering-clearance lamp chamber 14C and at the other end to a connector 22C which is fixed at the bottom edge portion of the rear wall portion 12a. Each of the electric cords 18D is connected at one end to a- light source bulb 20D of the front/side turn signal lamp chamber 14D and at the other end to a connector 22D which is also fixed at the bottom edge portion of the rear wall portion 12a. These electric cords 18C and 18D are bound together and covered by a tube 24 for a predetermined length at the vicinity of the connectors 22C and 22D. The power supply cords 18C are bound together and covered by a separate tube 26 for a predetermined length, after they separate from the power 20 supply cords 18D.

The lamp body 12 is formed with a boss 12d (apart of retaining structure) at the rear wall portion 12a in the vicinity of the annular wall 12c. The part of the power supply cords 18C and 18D covered by the tube 24 extend between the boss 12d and the annular 25 wall 12c such that the power supply cords 18C and 18D are retained in and prevented from deviating apart from the annular wall 12c. As best shown in FIG. 3, according to the embodiment, the boss 12d is conical with its top cut out.

The lamp body 12 is further formed with a hook 12e (another part of the retaining structure) on the rear wall portion 12a in the vicinity of the annular wall 12c. The hook 12e positions such that the hook 12e and the boss 12d are on a periphery surrounding the annular wall 12c at a predetermined distance there between. The hook 12e is formed like a reverse L-shape and its tip endpoints to the annular wall 12c, as shown in FIG. 3. Referring back to FIG. 1, the part of the power supply cords 18C covered by the tube 26 runs under the hook 12e such that the cords 18C are retained in and prevented from deviating apart from the annular wall 12c. The lamp body 12 is also formed with a clip 12f on the rear wall portion 12a between the light source bulbs 20C and 20D, for securing the power supply cords 18C.

According to the present embodiment, the boss 12d and the hook 12e are formed integrally with the rear wall portion 12a of the lamp body 12 by an injection molding. However, the invention is not limited thereto or thereby. For example, either one of the boss 12d and the hook 12e maybe separately formed and attached to the rear wall portion 12a by adhering or press fitting by means of the protrusion-and-hole engagement.

As shown in FIG. 2, the back cover 16 is attached to the annular wall 12c by rotating the back cover 16 around a center axis Ax of the opening 12b with the back cover 16 contacting the annular wall 12c. The back cover 16 is formed with a protrusion 16a having a trapezoidal like form and protruding outwardly. A restricting flange 16a is formed such that it positions in the middle of the boss 12d and the hook 12e when the back cover 16 is completely attached to the annular wall 12c. It means that the electric cords 18C run under the restricting flange 16a. Therefore, the restricting flange 16a restricts the power supply cords 18C in order to prevent the cords from popping out of the desired place defined by the annular wall 12c, the boss 12d and the hook 12e. The back cover 16 is formed with two ribs 16b and 16c for helping an operator's hand when attaching the back cover 16 to the annular wall 12c by rotation. One of the ribs, the rib 16c, extends to the edge of the restricting flange 16a for reinforcing the restricting flange 16a. According to the present embodiment, the restricting flange 16a is integrally formed with the back cover 16 by an injection molding.

As described above, the vehicular lamp 10 according to the present embodiment has a structure in which the electric cords 18C and 18D run in the vicinity of the annular wall 12c for receiving the back cover 18, and the boss 12d and the hook 12e are formed in the vicinity of the annular wall 12c in the lamp body 12, spaced apart from each other by a predetermined distance. The boss 12d and the hook 12e retain the power supply cords 18C and 18D in order to prevent the cords from deviating apart from the annular wall 12c. Furthermore, as the restricting flange 16a is formed at the outer peripheral of the back cover 16 such that it positions in the middle of the boss 12d and the hook 12e, the electric cord 18C is restricted by the restricting flange 16a in order not to pop out of the desired position defined by the annular wall 12c, the boss 12d and the hook 12e. As for the power supply cords 18D, the power supply cords 18D are bound with the power supply cords 18C by the tube 24, and the tube 24 is positioned between the boss 12d and the annular wall 12. Therefore, the power supply cords 18D are retained by the boss 12d in order not to deviate apart from the annular wall 12c. Due to this, when the vehicular lamp 10 is attached to a vehicle body, the power supply cords 18C and 18D are not caught by the lamp and the vehicle body.

As described above, according to the present invention, control of the power supply cords can be realized by employing few parts and with a low cost, so that the power supply cords are not caught by the lamp and the vehicle body.

Furthermore, in the above embodiment, as the power supply cords 18C and 18D are respectively connected to the cornering-clearance lamp chamber 14C and the front/side turn signal lamp chamber 14D positioned adjacent to the low beam lamp chamber 14B positioned in front of the opening 12b, these power supply cords 18C and 18D are easily set running.

Figure 4:
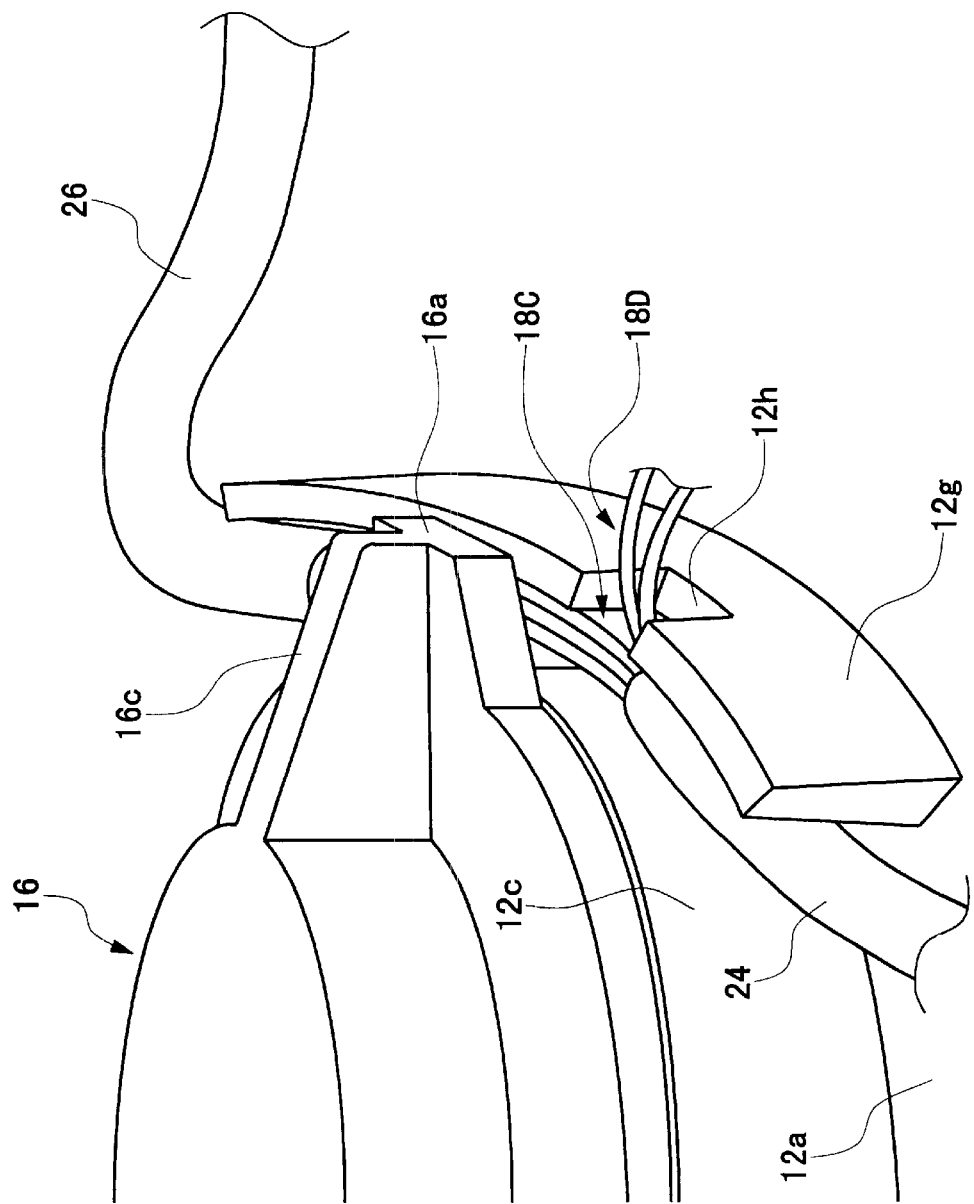
FIG. 4 is an enlarged perspective view showing another embodiment of the vehicular lamp.
Figure 5:
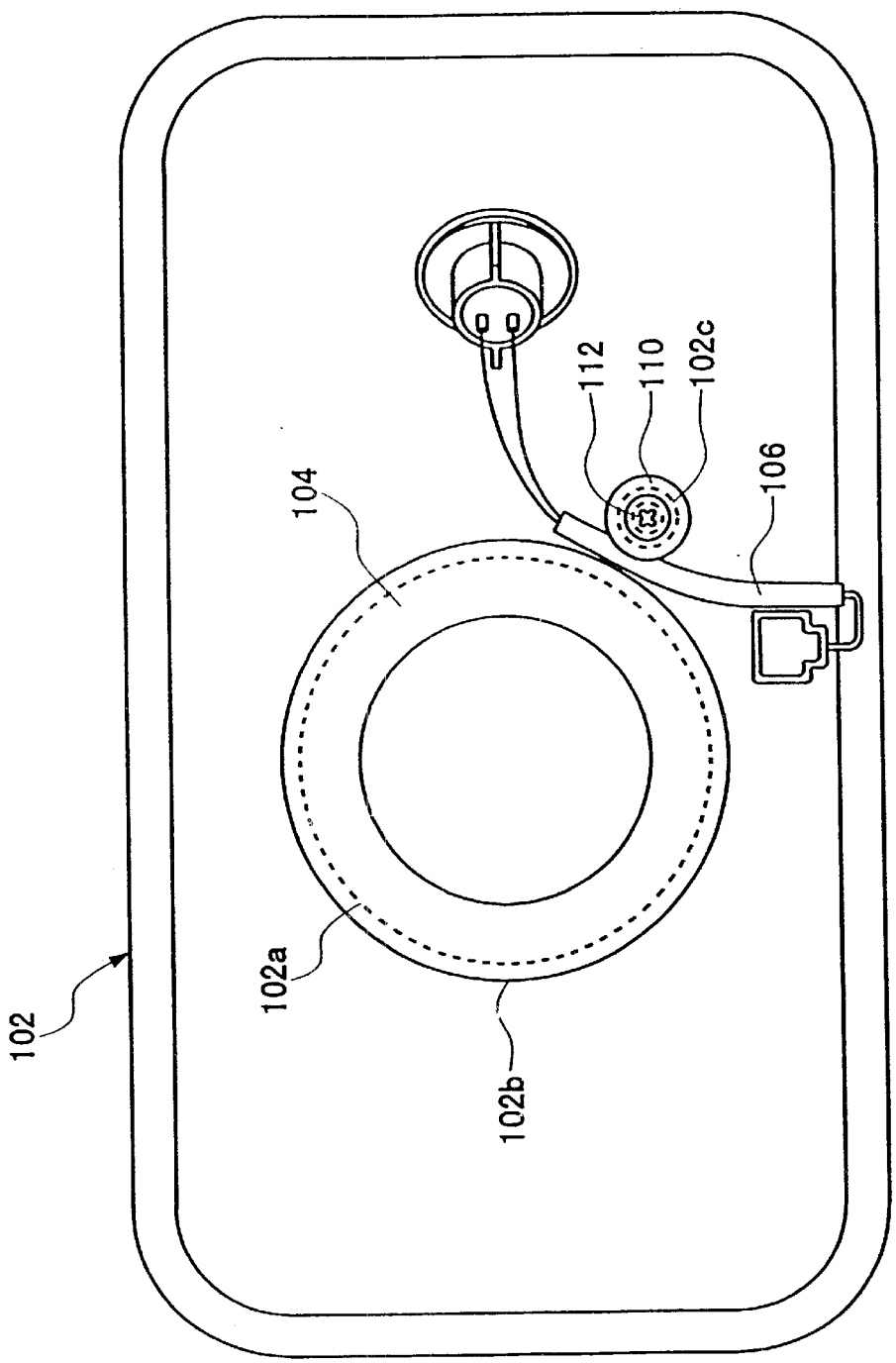
FIG. 5 is a backside view showing a conventional vehicular lamp.

FIG. 4 is an enlarged perspective view showing another embodiment of the vehicular lamp.

In the above first embodiment shown in FIG. 1, the boss 12d and the hook 12e are formed as separate parts of the retaining structure. In the present embodiment, however, the lamp body 12 is formed with a rib 12g serving as a single retaining structure, extending along the annular wall 12c from a first position where the boss 12d is formed to a second position where the hook 12e is formed in the first embodiment. The rib 12g is formed having a cut-out portion 12h to allow the power supply cords 18D to pass through.

As described in this embodiment, by providing the rib 12g, the power supply cords 18C and 18D are retained in order not to deviate apart from the annular wall 12c. Furthermore, the restricting flange 16a on the back cover 16 restricts the power supply cords 18C in order not to pop up from the rear wall portion 12a. Therefore, when the vehicular lamp 10 is attached to a vehicle body, the power supply cords 18C and 18D are not caught by the lamp and the vehicle body.

Figure 6:
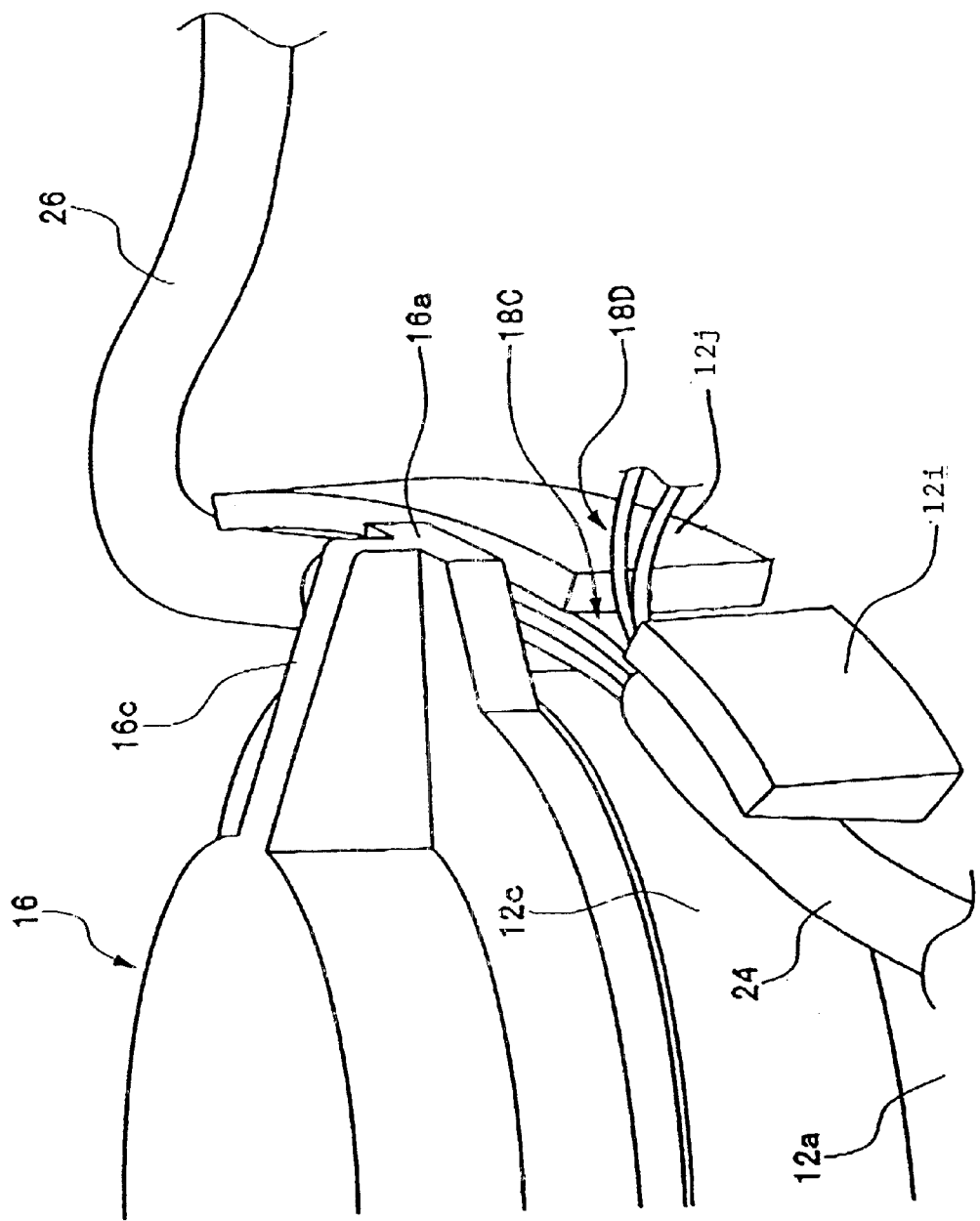
FIG. 6 is an enlarged perspective view showing another embodiment of the vehicular lamp according to the present invention.

Furthermore, instead of forming the single rib 12g as described in this embodiment, a plurality of ribs 12i and 12j may be formed along the annular wall 12c as shown in FIG. 6. With these ribs 12i and 12j, the same functions and advantages as the above embodiments can be obtained.

Furthermore, although the back cover 16 is attached to the annular wall 12c by rotating the back cover 16 in the above embodiments, the back cover 16 may be attached to the annular wall 12c by pushing the cover 16. The same operations and advantages as the above embodiments can be obtained in this case as well.

Although the present invention has been described by way of exemplary embodiments, it should be understood that many changes and substitutions may be made by those skilled in the art without departing from the spirit and the scope of the present invention which is defined only by the appended claims.

What is claimed is:

1. A vehicular lamp comprising:

a light source bulb;

a lamp body having a rear wall portion formed with an opening and an annular wall surrounding a periphery of said opening;

a back cover attached to said annular wall to cover said opening;

a power supply cord running in the vicinity of said annular wall and connecting to said light source bulb; and a cord retaining structure projecting from said rear wall portion of said lamp body in the vicinity of said annular wall, said retaining structure engaging with said power supply cord;

wherein said retaining structure comprises a first retaining member and a second retaining member separate from each other by a predetermined distance there between.

2. The vehicular lamp according to claim 1, wherein said first retaining member comprises a boss projecting from said rear wall portion of said lamp body and said second retaining member comprises a hook which is formed like a reverse L-shape and its tip end pointing to said annular wall.

3. The vehicular lamp according to claim 2, wherein said boss is conical with its top cut off.

4. The vehicular lamp according to claim 1, further comprising a third retaining member disposed between said first and second retaining members and said light source bulb.

5. The vehicular lamp according to claim 2, wherein said back cover comprises a restricting flange extending over said power supply cord in the middle of said first retaining member and said second retaining member.

6. The vehicular lamp according to claim 5, wherein said back cover further comprises a rib extending from substantially the center thereof to said restricting flange.

7. The vehicular lamp according to claim 5, wherein said restricting flange is formed integrally with said back cover by injection molding.

8. A vehicular lamp comprising:

a light source bulb;

a lamp body having a rear wall portion formed with an opening and an annular wall surrounding a periphery of said opening;

a back cover attached to said annular wall to cover said opening;

a power supply cord running in the vicinity of said annular wall and connecting to said light source bulb; and a cord retaining structure projecting from said rear wall portion of said lamp body in the vicinity of said annular wall, said retaining structure engaging with said power supply cord;

wherein said retaining structure comprises at least one wall extending along said annular wall.

9. The vehicular lamp according to claim 8, wherein said retaining structure comprises a plurality of walls extending along said annular wall.

10. The vehicular lamp according to claim 8, wherein said wall comprises a cut-out portion.

11. A vehicular lamp comprising:

a light source bulb;

a lamp body having a rear wall portion formed with an opening and an annular wall surrounding a periphery of said opening;

a back cover attached to said annular wall to cover said opening;

a power supply cord running in the vicinity of said annular wall and connecting to said light source bulb; and a cord retaining structure projecting from said rear wall portion of said lamp body in the vicinity of said annular wall, said retaining structure engaging with said power supply cord;

wherein said back cover comprises a restricting flange extending over said power supply cord.

12. The vehicular lamp according to claim 11, wherein said back cover further comprises a rib extending from substantially the center thereof to said restricting flange.

13. The vehicular lamp according to claim 11, wherein said restricting flange is formed integrally with said back cover by injection molding.

14. A vehicular lamp comprising:

a light source bulb;

a lamp body having a rear wall portion formed with an opening and an annular wall surrounding a periphery of said opening;

a back cover attached to said annular wall to cover said opening;

a power supply cord running in the vicinity of said annular wall and connecting to said light source bulb;

a cord retaining structure projecting from said rear wall portion of said lamp body in the vicinity of said annular wall, said retaining structure engaging with said power supply cord; and a clip member engaging with said power supply cord and disposed between said retaining structure and said light source bulb.

15. A vehicular lamp comprising:

a lamp body which is formed with an opening and an annular wall extending along a periphery of said opening;

a back cover mounted on said annular wall to close said opening;

a power supply cord running in the vicinity of said annular wall;

a first restricting projection formed on said lamp body in the vicinity of said annular wall thereof for preventing said power supply cord from deviating apart from said annular wall; and a second restricting projection formed on an outer periphery of said back cover for preventing said power supply cord from popping out of a position defined between said annular wall and said first restricting projection.

* * * * *